US012649428B2

(12) United States Patent
Yamaguchi et al.

(10) Patent No.: US 12,649,428 B2
(45) Date of Patent: Jun. 9, 2026

(54) ELECTRIC JUNCTION BOX FOR VEHICLE

(71) Applicant: YAZAKI CORPORATION, Tokyo (JP)

(72) Inventors: Hayato Yamaguchi, Makinohara (JP); Syuji Kimura, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 294 days.

(21) Appl. No.: 18/235,655

(22) Filed: Aug. 18, 2023

(65) Prior Publication Data

US 2024/0083372 A1 Mar. 14, 2024

(30) Foreign Application Priority Data

Sep. 12, 2022 (JP) ................................. 2022-144777

(51) Int. Cl.
| | |
|---|---|
| *B60R 16/023* | (2006.01) |
| *B60R 16/02* | (2006.01) |
| *H01R 9/24* | (2006.01) |
| *H01R 25/16* | (2006.01) |
| *H02G 3/08* | (2006.01) |
| *H02G 3/16* | (2006.01) |

(52) U.S. Cl.
CPC ...... *B60R 16/0239* (2013.01); *B60R 16/0215* (2013.01); *H01R 9/2483* (2013.01); *H01R 25/162* (2013.01); *H02G 3/081* (2013.01); *H02G 3/16* (2013.01); *H01R 2201/26* (2013.01)

(58) Field of Classification Search
None
See application file for complete search history.

(56) References Cited

U.S. PATENT DOCUMENTS

| | | | | | |
|---|---|---|---|---|---|
| 4,519,668 A | * | 5/1985 | Fujita | ..................... | H01R 4/301 |
| | | | | | 439/775 |
| 4,944,700 A | * | 7/1990 | Simon | ...................... | H01R 4/30 |
| | | | | | 439/856 |
| 5,025,121 A | * | 6/1991 | Allen | ....................... | H01H 1/42 |
| | | | | | 200/254 |
| 5,643,693 A | * | 7/1997 | Hill | ..................... | H01M 50/296 |
| | | | | | 429/123 |
| 5,788,529 A | * | 8/1998 | Borzi | ................... | H01R 9/2458 |
| | | | | | 29/830 |

(Continued)

FOREIGN PATENT DOCUMENTS

JP 5958761 B2 8/2016

*Primary Examiner* — Felix O Figueroa
(74) *Attorney, Agent, or Firm* — Sughrue Mion, PLLC

(57) ABSTRACT

An electric junction box for a vehicle includes a housing including a connector housing configured to be fitted to a counterpart connector, a plurality of connector terminals being provided in the connector housing, a joint busbar accommodated in the housing, the joint busbar integrally including a plurality of terminals configured to be respectively connected to ground terminals of the counterpart connector, the plurality of terminals being provided as a part of the plurality of connector terminals, and a conductive member supported by the housing and configured to be grounded to a vehicle body. The joint busbar includes a plate-shaped connection piece connected to the conductive member. The conductive member includes an elastic connection portion that is in elastic contact with the connection piece.

9 Claims, 12 Drawing Sheets

10-10

(56)                    References Cited

U.S. PATENT DOCUMENTS 5,941,716  A  *    8/1999  Yoshigi ................ F16K 27/003
                                                    439/95
6,431,880  B1 *    8/2002  Davis .................. H01R 9/2491
                                                    439/949
6,748,651  B2 *    6/2004  Miyajima ............. H05K 3/326
                                                    174/70 B
2011/0084549  A1 *    4/2011  Scheele ................. H05K 7/026
                                                    307/9.1

* cited by examiner 2-2

10-10

ELECTRIC JUNCTION BOX FOR VEHICLE

CROSS-REFERENCE TO RELATED APPLICATIONS

This application is based on and claims priority under 35 USC 119 from Japanese Patent Application No. 2022-144777 filed on Sep. 12, 2022, the contents of which are incorporated herein by reference.

TECHNICAL FIELD

The present disclosure relates to an electric junction box for vehicle.

BACKGROUND ART

A wire harness coupled to various loads such as a motor, a lamp, and a sensor is connected to an electric junction box for vehicle by a connector. The loads may be grounded in a position on a load side on a load basis, and may also be grounded collectively on an ECU side, for example. An ECU is accommodated in the electric junction box. When the loads are collectively grounded on the ECU side, plural ground terminals coupled to the loads are arranged in one connector and are grounded in a wide range through a circuit board in the ECU.

Regarding the ground connection of a circuit board, as described in JP5958761B, for example, a circuit board is fastened by a bolt to a conductive member fixed to a vehicle body, and a ground circuit on the circuit board is body grounded through the bolt and the conductive member.

When the body ground is performed by bolt fastening, however, workability may be poor, the number of assembling steps may increase, and costs may increase.

The present disclosure provides an electric junction box in which plural ground terminals of a connector can be easily and collectively grounded to a vehicle body.

SUMMARY OF INVENTION

According to the present disclosure, an electric junction box for vehicle. The electric junction box includes a housing including a connector housing configured to be fitted to a counterpart connector, a plurality of connector terminals being provided in the connector housing, a joint busbar accommodated in the housing, the joint busbar integrally including a plurality of terminals configured to be respectively connected to ground terminals of the counterpart connector, the plurality of terminals being provided as a part of the plurality of connector terminals, and a conductive member supported by the housing and configured to be grounded to a vehicle body. The joint busbar includes a plate-shaped connection piece connected to the conductive member. The conductive member includes an elastic connection portion that is in elastic contact with the connection piece.

DESCRIPTION OF EMBODIMENTS

Specific embodiments of the present disclosure will be described below with reference to the drawings.

First Embodiment

Figure 1:
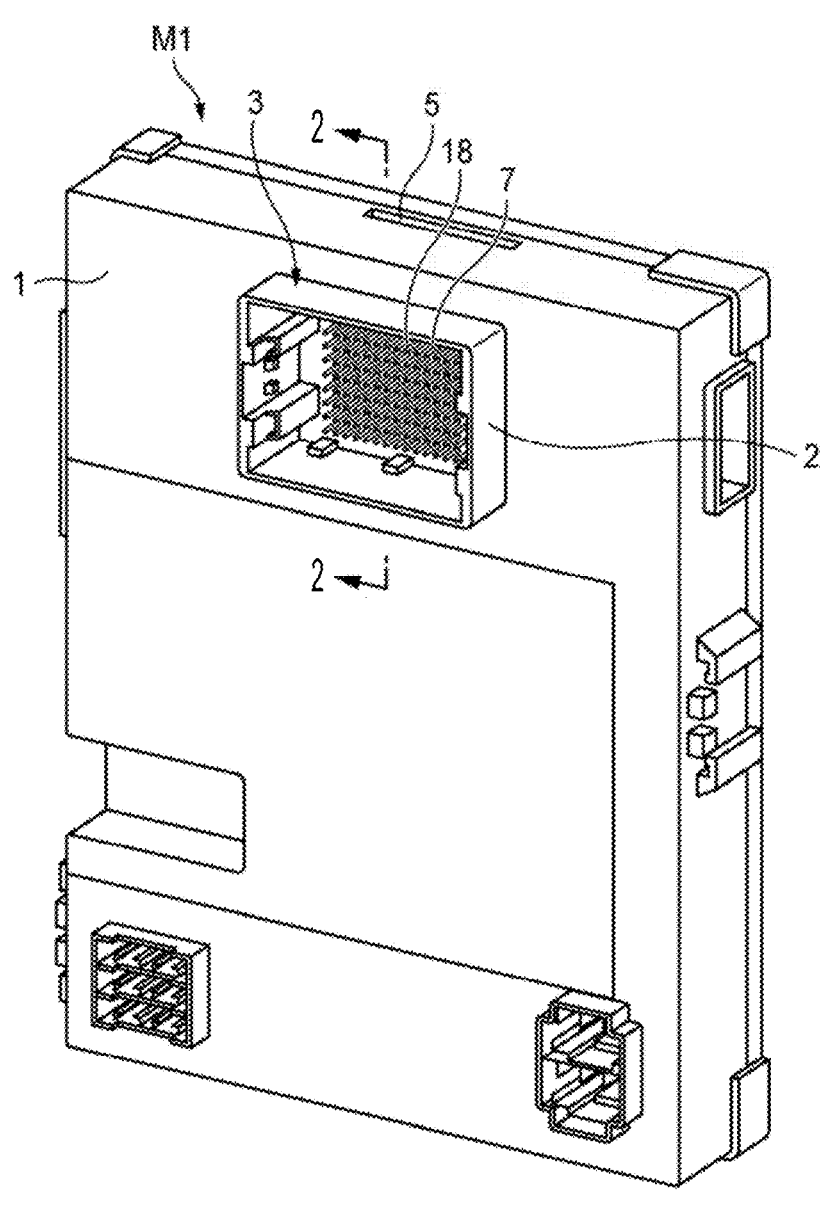
FIG. 1 is an external perspective view of an electric junction box according to a first embodiment of the present disclosure.
Figure 2:
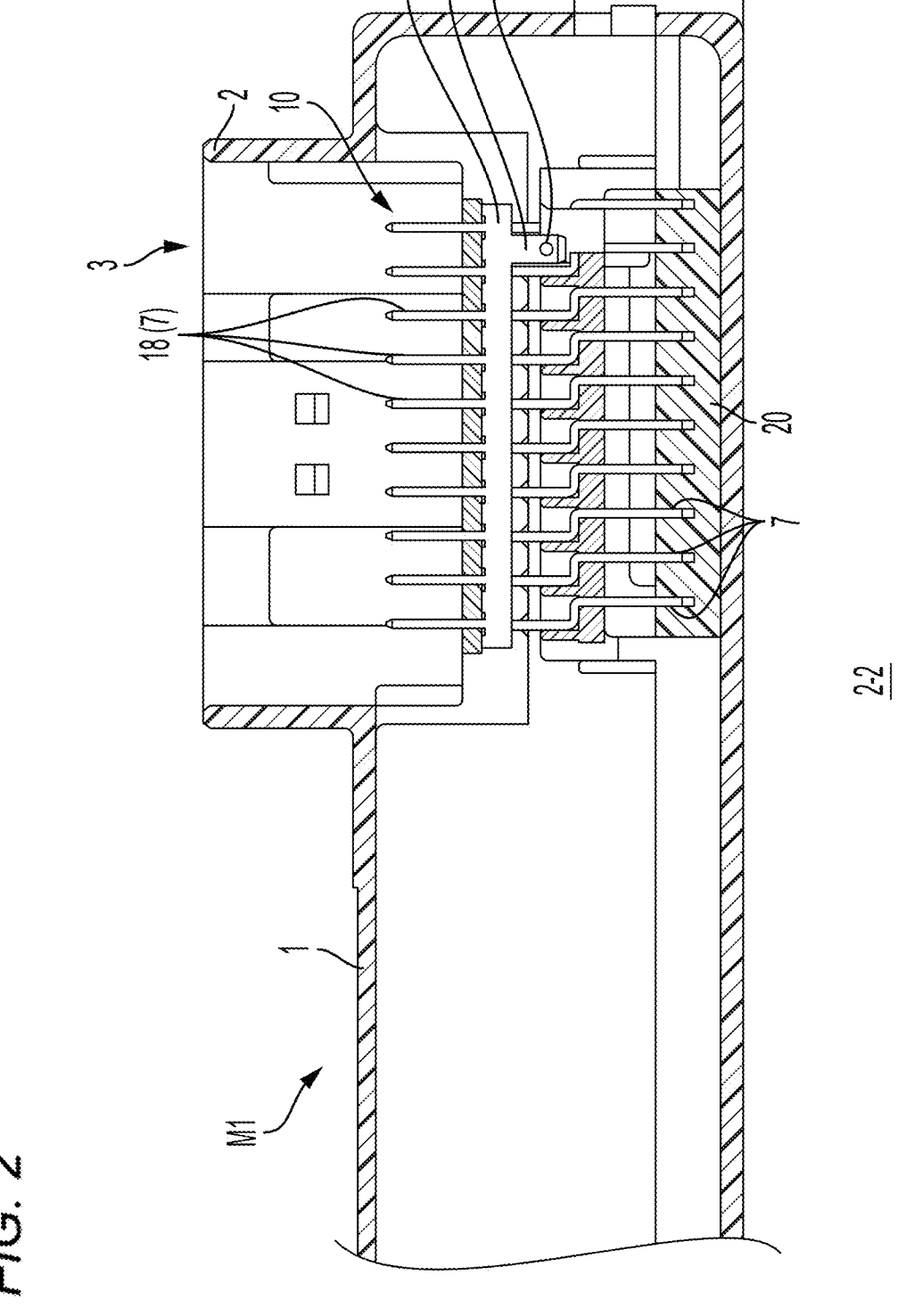
FIG. 2 is a cross-sectional view taken along a line A-A in FIG. 1 and schematic view of a joint busbar.
Figure 3:
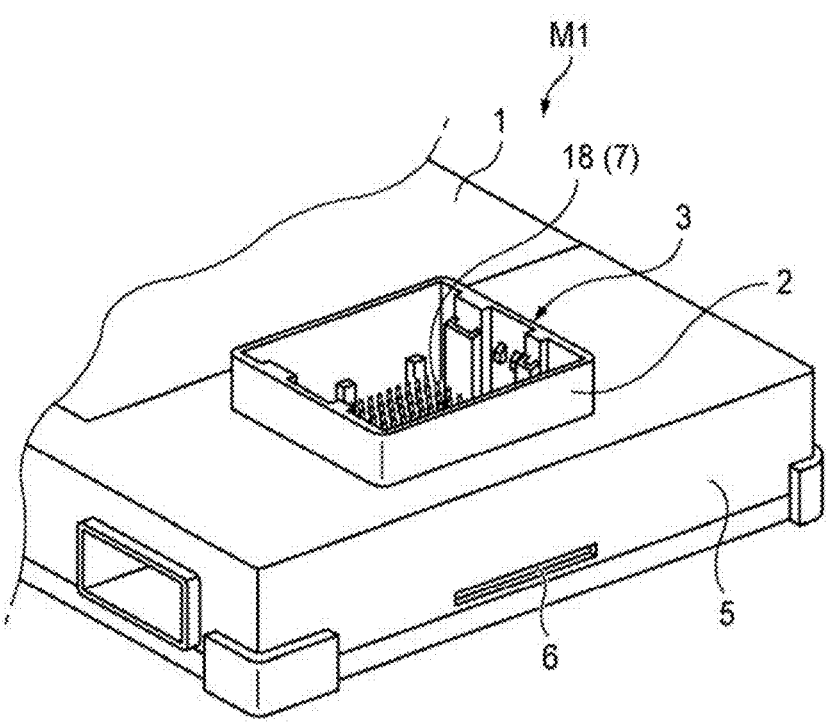
FIG. 3 is a perspective view of a slit provided in the electric junction box.
Figure 4:
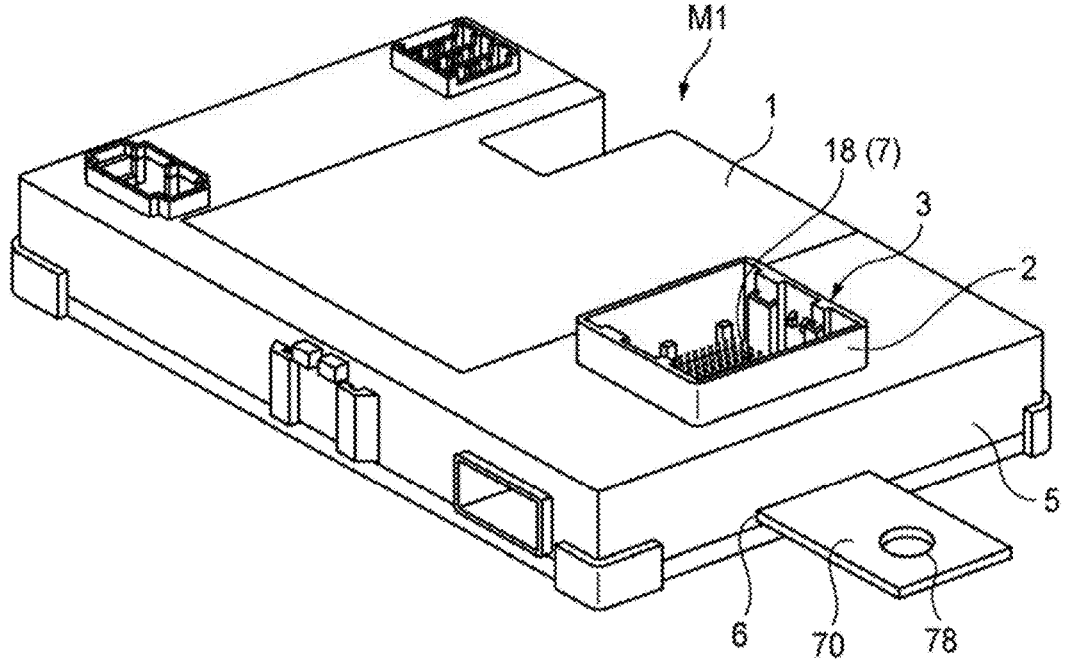
FIG. 4 is a perspective view illustrating a state in which a conductive member is inserted into the slit.
Figure 5:
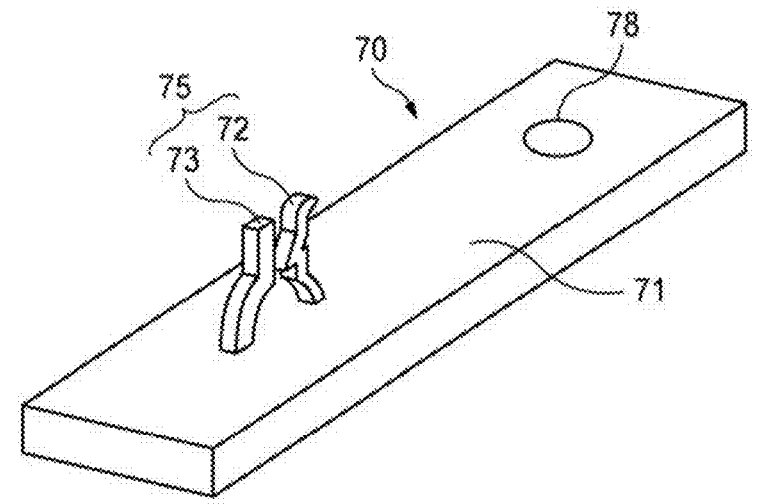
FIG. 5 is a perspective view of the conductive member used in the electric junction box.
Figure 6:
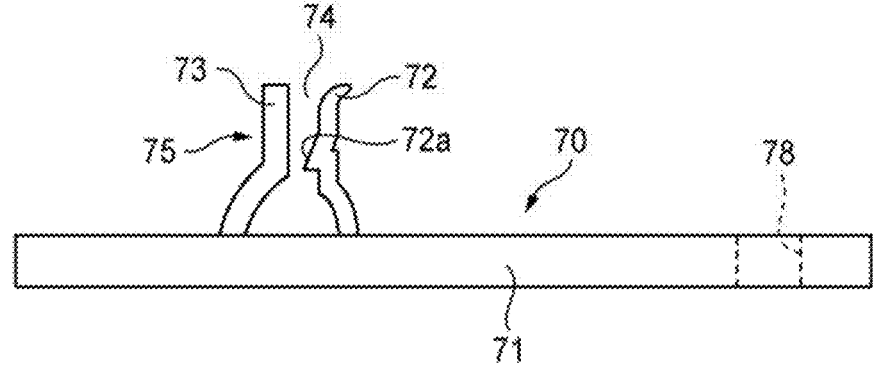
FIG. 6 is a side view of the conductive member.
Figure 7:
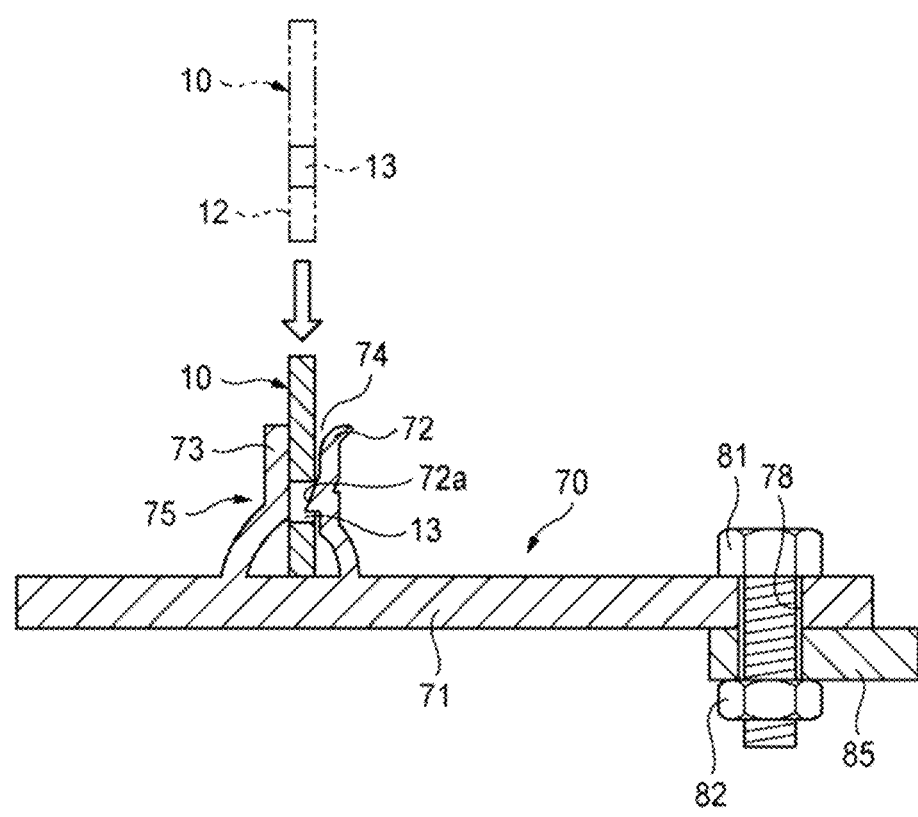
FIG. 7 is a side view illustrating a connection state of the conductive member and the joint busbar.

An electric junction box M1 for vehicle according to a first embodiment of the present disclosure will be described with reference to FIGS. 1 to 7. FIG. 1 is an external perspective view of the electric junction box M1 according to the first embodiment. FIG. 2 is a cross-sectional view taken along a line A-A in FIG. 1 and schematic view of a joint busbar 10. FIG. 3 is a perspective view of a slit 6 provided in the electric junction box M1. FIG. 4 is a perspective view illustrating a state in which a conductive member 70 is inserted into the slit 6. FIG. 5 is a perspective view of the conductive member 70. FIG. 6 is a side view of the conductive member 70. FIG. 7 is a side view illustrating a connection state of the conductive member 70 and the joint busbar 10.

As illustrated in FIGS. 1 and 2, the electric junction box M1 according to the present embodiment includes a housing 1 made of resin. The housing 1 includes a connector housing 2 for fitting a counterpart connector. The connector housing 2 faces outward. The housing 1 accommodates the joint busbar 10 therein. The joint busbar 10 integrally includes plural terminals 18 to be respectively connected to ground terminals of a counterpart connector. The plural terminals 18 are provided as a part of plural connector terminals 7 regularly arranged in the connector housing 2.

The connector terminals 7 other than the terminals 18 of the joint busbar 10 are connected and fixed to a circuit board 20 accommodated in the housing 1. The connector terminals 7 including the plural terminals 18 of the joint busbar 10 are arranged in a predetermined array inside the connector housing 2. The connector terminals 7 and the connector housing 2 constitute a female connector 3 for fitting and connecting a counterpart male connector.

As illustrated in FIG. 2, the joint busbar 10 includes an array of the plural terminals 18 that are a part of the connector terminals 7 on one side in a width direction of a common plate portion 11 having a band plate shape, and includes a connection piece 12 protruding in a band plate shape on an end portion on the other side in the width direction of the common plate portion 11. The connection piece 12 is formed with a round hole (recess portion) 13 that engages with a protrusion 72*a* provided on a clamping piece 72 of the conductive member 70 to be described later.

As illustrated in FIG. 4, the conductive member 70 is supported by the housing 1, and has a part located inside and the remaining part located outside the housing 1. The conductive member 70 is constituted by a band-shaped metal plate 71 to be grounded to a vehicle body. As illustrated in FIGS. 3 and 4, the conductive member 70 protrudes from inside the housing 1 to outside through the slit 6 provided in a wall 5 of the body 1.

As illustrated in FIGS. 5 and 6, the conductive member 70 includes, at a portion located inside the housing 1, an elastic connection portion 75 that is in elastic contact with the connection piece 12 of the joint busbar 10. In the present embodiment, the conductive member 70 includes, at the portion located inside the housing 1, a pair of clamping pieces 72, 73 that are the elastic connection portion 75. The pair of clamping pieces 72, 73 clamp the connection piece 12 of the joint busbar 10 since the connection piece 12 is inserted in between. A gap 74 for inserting the connection piece 12 is ensured between the pair of clamping pieces 72, 73.

At least the clamping piece 72 of the pair of clamping pieces 72, 73 is provided with the protrusion 72*a* that engages with the round hole 13 of the connection piece 12 of the joint busbar 10 to prevent the connection piece 12 from coming off from the pair of clamping pieces 72, 73. The conductive member 70 is provided with, at a portion located outside the housing 1, a bolt through hole 78 for fixing to the vehicle body.

As illustrated in FIG. 7, the joint busbar 10 is electrically connected to the conductive member 70 since the connection piece 12 is inserted into the gap 74 between the pair of clamping pieces 72, 73 of the conductive member 70. The conductive member 70 is fastened to a grounding bracket 85 fixed to the vehicle body by a bolt 81 passing through the bolt through hole 78 and a nut, and is thereby body-grounded. Accordingly, the joint busbar 10 is grounded to the vehicle body.

As described above, according to the electric junction box M1 according to the first embodiment, when a counterpart connector is connected to the connector housing 2, which faces outward, of the housing 1 of the electric junction box M1, plural ground terminals of the counterpart connector coupled to respective loads can be collectively connected to the joint busbar 10 in the housing 1. Since the joint busbar 10 is grounded to the vehicle body through the conductive member 70, the plural ground terminals of the counterpart connector are grounded to the vehicle body collectively through the joint busbar 10 and the conductive member 70.

Accordingly, it is not necessary to individually perform the ground connection of the ground terminals of the respective loads, and the number of assembling steps can be reduced. Since the ground terminals of the connector are grounded to the vehicle body through the joint busbar 10 and the conductive member 70, it is not necessary to perform the ground connection of the ground terminals through the circuit board 20 inside the electric junction box M1, and the electric junction box M1 itself can be downsized by saving space of the circuit board 20. In addition, the electrical connection between the joint busbar 10 and the conductive member 70 is implemented by, instead of bolt fastening, the elastic contact of the elastic connection portion of the conductive member 70 with the connection piece 12 of the joint busbar 10. Accordingly, assembly is easy and work efficiency can be improved.

According to the first embodiment, the joint busbar 10 can be easily grounded by simply inserting the connection piece 12 of the joint busbar 10 into the gap 74 between the pair of clamping pieces 72, 73 provided on the conductive member 70. By simply inserting the connection piece 12 of the joint busbar 10, the protrusion 72*a* of one clamping piece 72 can be engaged with the round hole 13 of the connection piece 12. Accordingly, the connection piece 12 can be prevented from coming off.

Instead of the round hole 13 provided in the connection piece 12 of the joint busbar 10, a non-penetrating recess (recess portion) may be provided.

Instead of the pair of clamping pieces 72, 73, a spring piece that is in elastic contact with the connection piece 12 may be provided.

Second Embodiment

Figure 8:
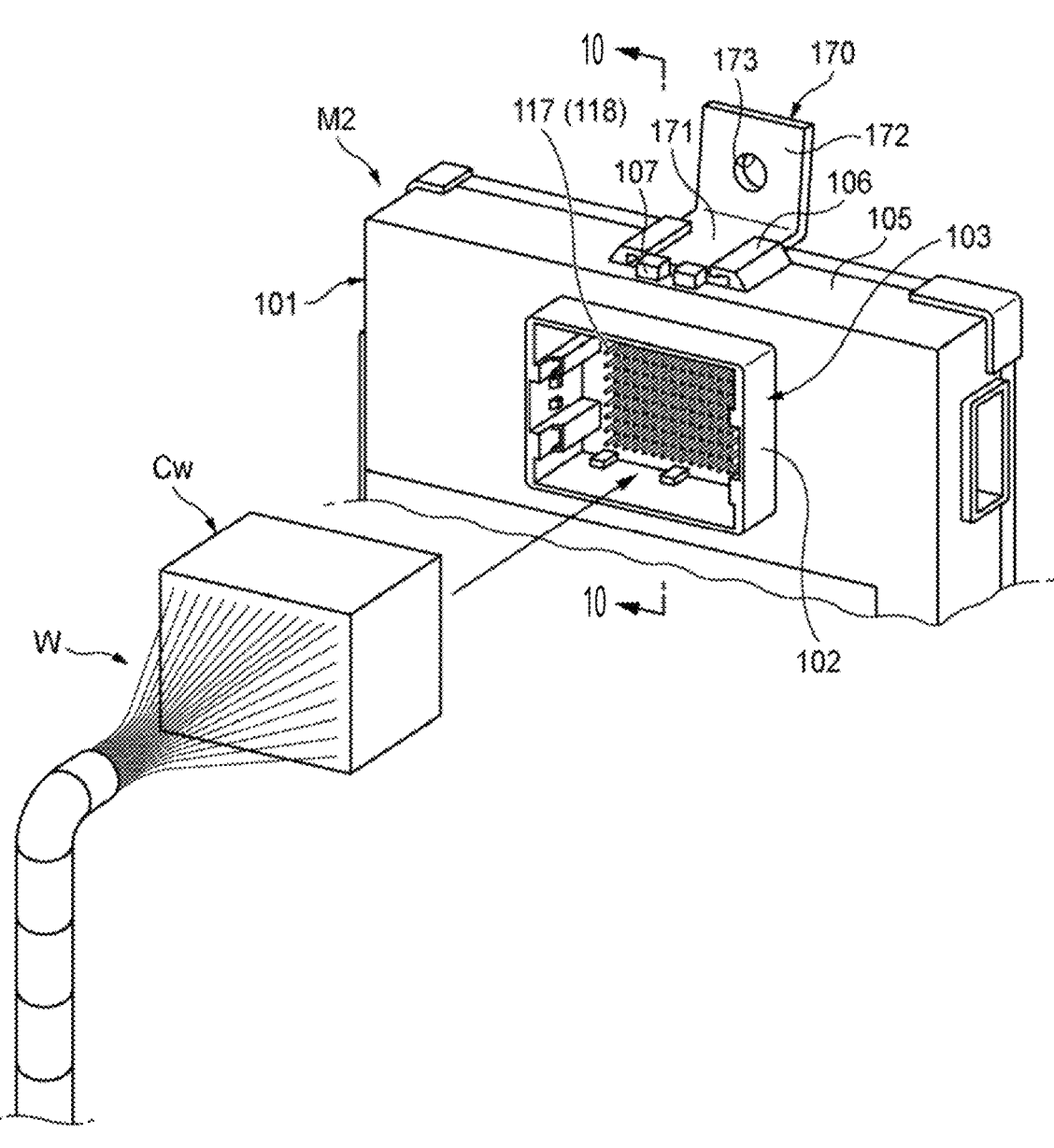
FIG. 8 is an external perspective view of a main part of an electric junction box according to a second embodiment of the present disclosure.
Figure 9:
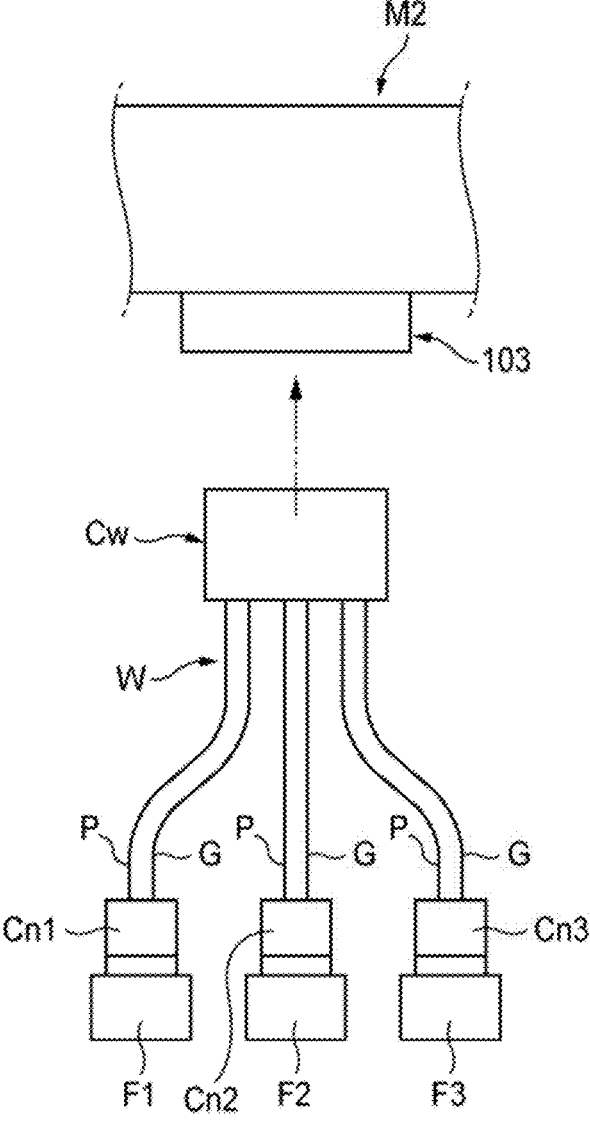
FIG. 9 is a schematic view of a wire harness to be connected to a connector of the electric junction box.
Figure 10:
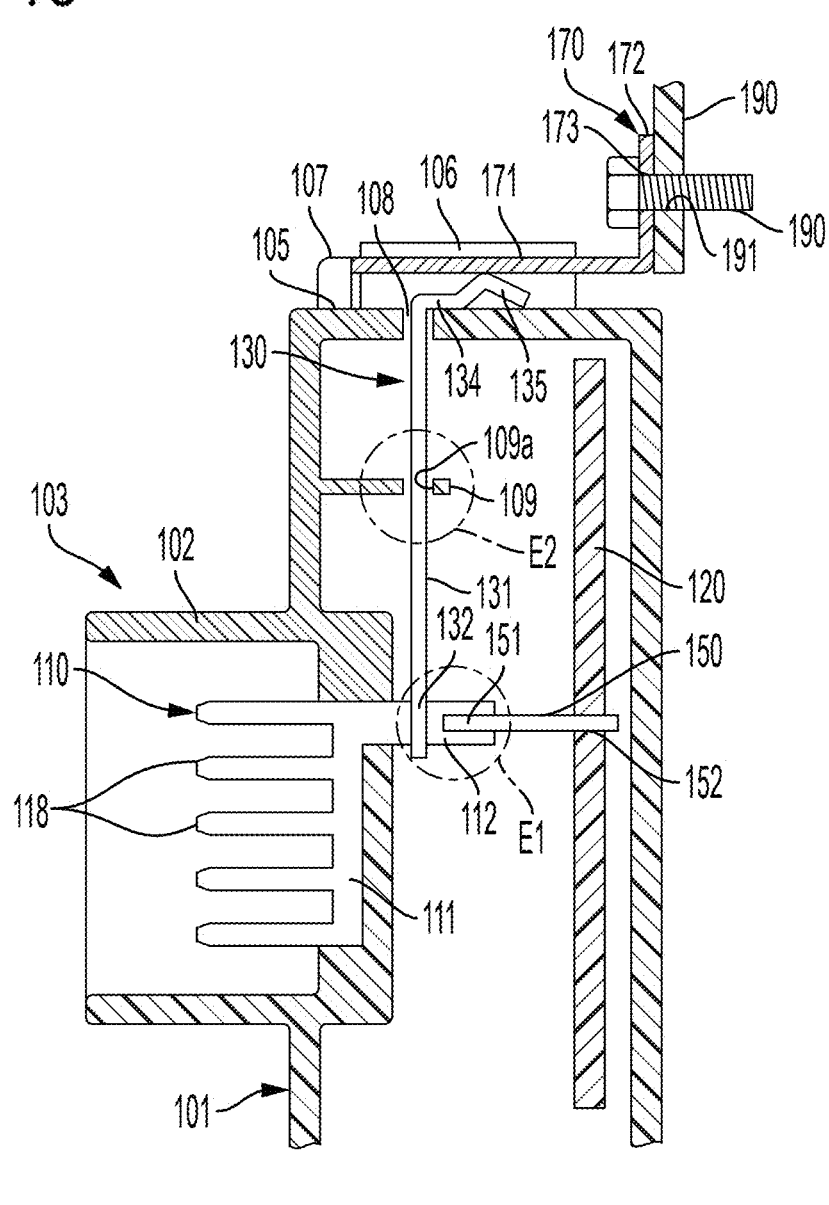
FIG. 10 is a schematic cross-sectional view taken along a line B-B in FIG. 8.
Figure 11:
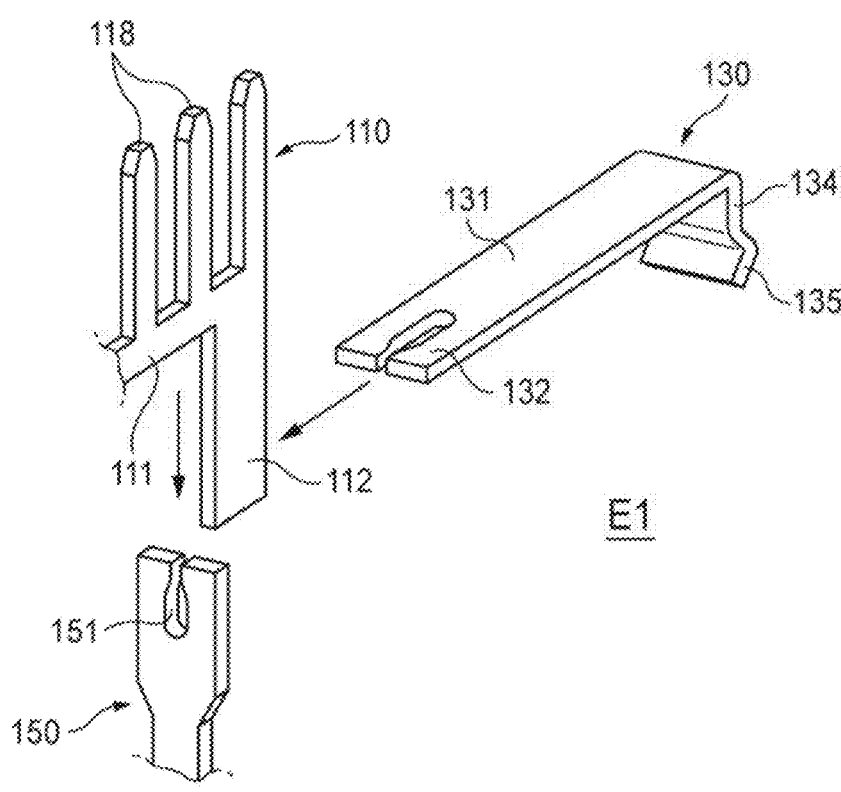
FIG. 11 is a schematic exploded perspective view illustrating a configuration of a portion E1 in FIG. 10.
Figure 12:
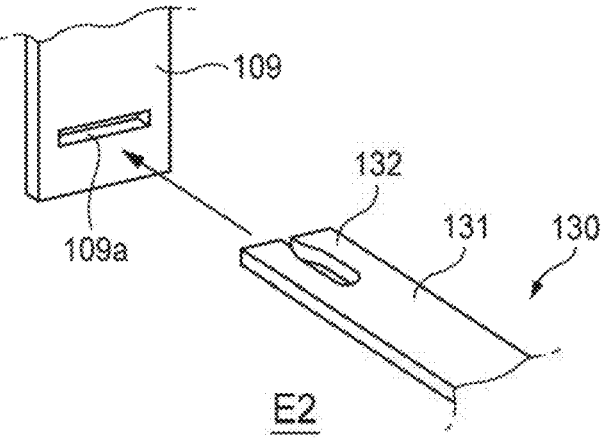
FIG. 12 is a schematic exploded perspective view illustrating a configuration of a portion E2 in FIG. 10.
Figure 13:
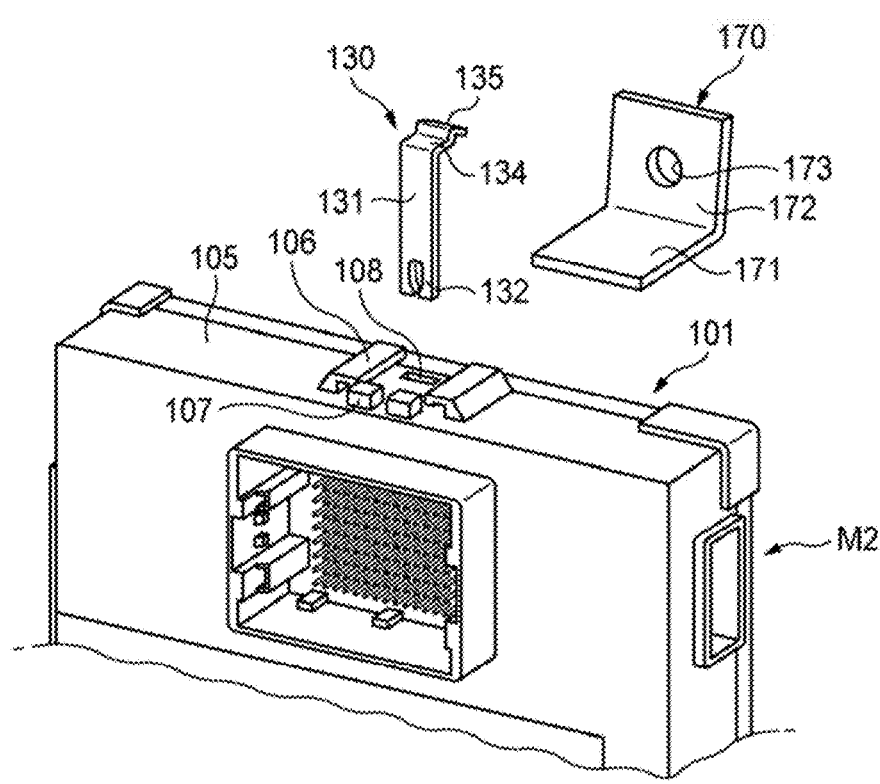
FIG. 13 is an exploded perspective view of a main part in FIG. 8.
Figure 14:
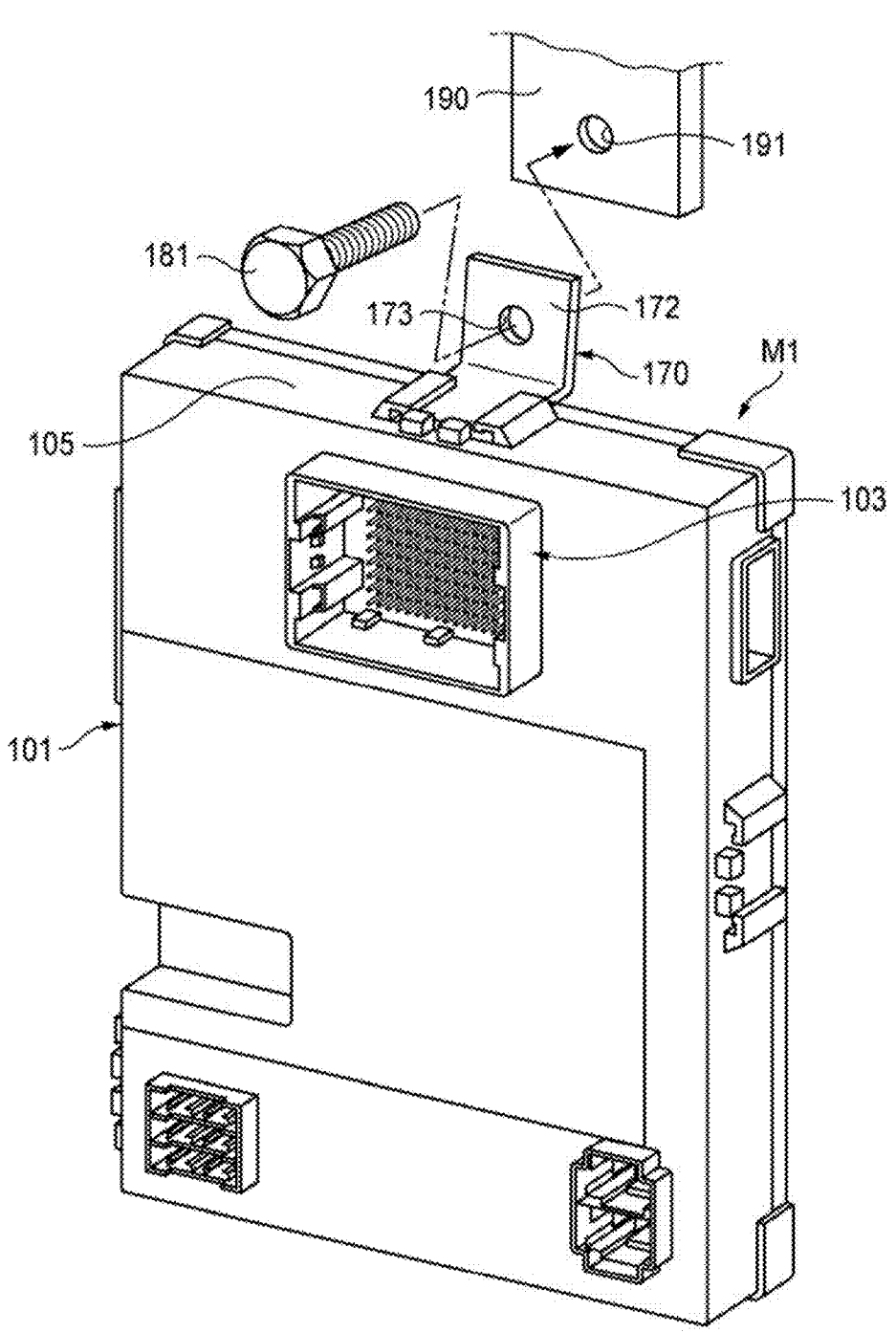
FIG. 14 is a schematic view illustrating a method for fixing an electric junction box using a grounding bracket in FIG. 13.

An electric junction box M2 for vehicle according to a second embodiment of the present disclosure will be described with reference to FIGS. 8 to 14. FIG. 8 is an external perspective view of a main part of the electric junction box M2 according to the second embodiment. FIG. 9 is a schematic view of a wire harness W to be connected to a female connector 103 of the electric junction box M2. FIG. 10 is a schematic cross-sectional view taken along a line B-B in FIG. 8. FIG. 11 is a schematic exploded perspective view illustrating a configuration of a portion E1 in FIG. 10. FIG. 12 is a schematic exploded perspective view illustrating a configuration of a portion E2 in FIG. 10. FIG. 13 is an exploded perspective view of a main part in FIG. 8. FIG. 14 is a schematic view illustrating a method for fixing the electric junction box M2 using a grounding bracket 170 in FIG. 13.

As illustrated in FIGS. 8 to 10, the electric junction box M2 according to the present embodiment includes a housing 101 made of resin. The housing 101 includes a connector housing 102 for fitting a counterpart connector. The connector housing 102 faces outward. The housing 101 accommodates a joint busbar 110 therein. The joint busbar 110 integrally includes plural terminals 118 to be respectively connected to ground terminals of a counterpart connector. The plural terminals 118 are provided as a part of plural connector terminals 117 regularly arranged in the connector housing 102.

The connector terminals 117 other than the terminals 118 of the joint busbar 110 are connected and fixed to a circuit board 120 accommodated in the housing 101. The connector terminals 117 including the plural terminals 118 of the joint busbar 110 are arranged in a predetermined array inside the connector housing 102. The connector terminals 117 and the connector housing 102 constitute the female connector 103 for fitting and connecting a counterpart male connector.

As illustrated in FIGS. 8 and 9, the wire harness W to be connected to the electric junction box M2 includes, at an end portion, a male connector Cw to be fitted to the female connector 103 of the electric junction box M2. The wire harness W includes electric wires P for power supply and signals and ground wires G that are coupled to plural loads F1 to F3 through connectors Cn1 to Cn3. The ground wires G are connected to a ground terminal of the male connector Cw at an end of the wire harness W.

As illustrated in FIG. 10, the joint busbar 110 includes an array of the plural terminals 118 that are a part of the connector terminals 117 on one side in a width direction of a common plate portion 111 having a band plate shape, and includes a connection piece 112 protruding in a band plate shape on an end portion on the other side in the width direction of the common plate portion 111.

A conductive member (also referred to as an intermediate busbar) 130 is supported by the housing 101, and has a first plate portion 131 located inside the housing 101 and a second plate portion 134 located outside the housing 101. The conductive member 130 is to be grounded to a vehicle body. As illustrated in FIG. 13, the first plate portion 131 is inserted from outside into inside the housing 101 through an insertion hole 108 provided in a wall 105 of the housing 101. The conductive member 130 is obtained by bending a band-shaped metal plate in a plate thickness direction in an L shape, and one side is the first plate portion 131 and the other side is the second plate portion 134 with a bending point as a boundary.

The conductive member 130 is provided with, at a top end of the first plate portion inserted into inside the housing 101, a first fork terminal 132 that is an elastic connection portion. The first fork terminal 132 is fitted to the connection piece 112 of the joint busbar 110 when the first plate portion 131 is inserted into inside the housing 101 from outside. FIG. 11 illustrates a relationship between the first fork terminal 132 and the connection piece 112. The housing 101 is provided with a guide portion 109 therein. The guide portion 109 guides the first fork terminal 132 provided at an insertion end of the conductive member 130 to a position in which the first fork terminal 132 is fitted to the connection piece 112 of the joint busbar 110 when the first plate portion 131 is inserted into inside the housing 101 from outside through the insertion hole 108. As illustrated in FIG. 12, the guide portion 109 has a through hole 109a for inserting the first plate portion 131 of the conductive member 130.

The second plate portion 134 of the conductive member 130, which is located outside the housing 101, is in close contact with the wall 105 of the housing 101 in a state in which the first plate portion 131 is inserted into inside the housing 101. The second plate portion 134 is provided with, at an end portion, a spring portion 135 that comes into elastic contact with the grounding bracket 170 fastened to a vehicle body 190, as illustrated in FIG. 10.

As illustrated in FIG. 13, the wall 105 of the housing 101 is provided with, on an outer surface, a fix-slide frame 106 for sliding and fixing a mounting piece 171 of the grounding bracket 170 bent in an L shape and a slide stopper 107 for determining a slide position. The insertion hole 108 for inserting the first plate portion 131 of the conductive member 130 into inside the housing 101 from outside is provided between left and right guide rails of the fix-slide frame 106.

When the first plate portion 131 of the conductive member 130 is inserted into inside the housing 101 through the insertion hole 108, the second plate portion 134 of the conductive member 130 is in close contact with the outer surface of the wall 105 of the housing 101. In this state, when the mounting piece 171 of the grounding bracket 170 is slid and fixed to the fix-slide frame 106, the spring portion 135 of the second plate portion 134 of the conductive member 130 is sandwiched between the mounting piece 171 of the grounding bracket 170 and the wall 105 of the housing 101. Accordingly, the conductive member 130 and the grounding bracket 170 are kept in a contact conduction state.

As illustrated in FIGS. 10 and 14, the grounding bracket 170 for fixing the electric junction box M2 is body-grounded by passing a bolt 181 through a bolt through hole 173 provided in a base plate 172 and fastening the bolt 181 to a screw hole 191 of the vehicle body 190. Accordingly, the joint busbar 110 is grounded to the vehicle body 190 through the conductive member 130 and the grounding bracket 170.

As illustrated in FIG. 10, the circuit board 120 is provided inside the housing 101, and a base end 152 of a second conductive member 150 is connected to a ground circuit of the circuit board 120. The second conductive member 150 is provided with a second fork terminal 151 at a top end. The second fork terminal 151 is fitted to the connection piece 112 of the joint busbar 110. FIG. 11 illustrates a relationship between the connection piece 112 and the second fork terminal 151 of the second conductive member 150.

As described above, according to the electric junction box M2 according to the second embodiment, when a counterpart connector is connected to the connector housing 102, which faces outward, of the housing 101 of the electric junction box M2, plural ground terminals of the counterpart connector coupled to respective loads can be collectively connected to the joint busbar 110 in the housing 101. Since the joint busbar 110 is grounded to the vehicle body 190 through the conductive member 130, the plural ground terminals of the counterpart connector are grounded to the vehicle body collectively through the joint busbar 110 and the conductive member 130.

Accordingly, it is not necessary to individually perform the ground connection of the ground terminals of the respective loads, and the number of assembling steps can be reduced. Since the ground terminals of the counterpart connector are grounded to the vehicle body through the joint busbar 110 and the conductive member 130, it is not necessary to perform the ground connection of the ground terminals through the circuit board 120 inside the electric junction box M2, and the electric junction box M2 itself can be downsized by saving the space of the circuit board 120. In addition, the electrical connection between the joint busbar 110 and the conductive member 130 is implemented by, instead of bolt fastening, the elastic contact of the elastic connection portion of the conductive member 130 with the connection piece 112 of the joint busbar 110. Accordingly, assembly is easy and work efficiency can be improved.

According to the electric junction box M2 according to the second embodiment, the first fork terminal 132 at the insertion end of the conductive member 130 can be fitted to the connection piece 112 of the joint busbar 110 by simply inserting the conductive member 130 from the insertion hole 108 of the housing, and the joint busbar 110 can be easily grounded.

According to the electric junction box M2 according to the second embodiment, the first fork terminal 132 at the insertion end of the conductive member 130 can be easily fitted to the connection piece 112 of the joint busbar 110 by the guidance of the guide portion 109.

Since the spring portion 135 is provided at the end portion of the second plate portion 134 of the conductive member 130 that is located outside the housing 101, the conductive member 130 can be easily and stably electrically connected by the spring portion 135 to the grounding bracket 170 that fixes the electric junction box M2.

According to the electric junction box M2 according to the second embodiment, the ground circuit of the circuit board 120 can be grounded to the vehicle body through the second conductive member 150, the joint busbar 110, and the conductive member 130.

Instead of the first and second fork terminals 132, 151, spring pieces that comes into elastic contact with the connection piece 112 may be provided.

When the ground connection is performed not through the grounding bracket 170 but through a connector that is separately connected to the electric junction box M2, the conductive member 130 may be not used. In this case, the second conductive member 150 replaces the unused conductive member 130.

Here, features of an electric junction box for vehicle according to the above described embodiments of the present disclosure will be briefly summarized and listed below.

According to an aspect of the present disclosure, an electric junction box (M1, M2) for vehicle, includes a housing (1, 101) including a connector housing (2, 102) configured to be fitted to a counterpart connector, a plurality of connector terminals being provided in the connector housing, a joint busbar (10, 110) accommodated in the housing (1, 101), the joint busbar integrally including a plurality of terminals (18, 118) configured to be respectively connected to ground terminals of the counterpart connector, the plurality of terminals (18, 118) being provided as a part of the plurality of connector terminals (7, 117), and a conductive member (70, 130) supported by the housing (1, 101) and configured to be grounded to a vehicle body. The joint busbar (10, 110) includes a plate-shaped connection piece (12, 112) connected to the conductive member (70, 130), and the conductive member (70, 130) includes an elastic connection portion (75, 132) that is in elastic contact with the connection piece (12, 112).

According to the above configuration, when the counterpart connector is connected to the connector housing (2, 102), which faces outward, of the housing (1, 101) of the electric junction box (M1, M2), the plurality of ground terminals of the counterpart connector coupled to respective loads can be collectively connected to the joint busbar (10, 110) in the housing (1, 101). Since the joint busbar (10, 110) is grounded to the vehicle body through the conductive member (70, 130), the plurality of ground terminals of the counterpart connector can be collectively grounded to the vehicle body through the joint busbar (10, 110) and the conductive member (70, 130). Accordingly, it is not necessary to individually perform the ground connection of the ground terminals of the respective loads, and the number of assembling steps can be reduced. Since the ground terminals of the counterpart connector are grounded to the vehicle body through the joint busbar (10, 110) and the conductive member (70, 130), it is not necessary to perform the ground connection of the ground terminals through the circuit board (20, 120) inside the electric junction box (M1, M2), and the electric junction box (M1, M2) itself can be downsized by saving space of the circuit board (20, 120). In addition, the electrical connection between the joint busbar (10, 110) and the conductive member (70, 130) is implemented by, instead of bolt fastening, the elastic contact between the elastic connection portion (75, 132) of the conductive member (70, 130) and the connection piece (12, 112) of the joint busbar (10, 110). Accordingly, assembly is easy and work efficiency can be improved.

According to an aspect of the present disclosure, the conductive member (70) is provided with, as the elastic connection portion (75), a pair of clamping pieces (72, 73) that clamp the connection piece (12) of the joint busbar (10) since the connection piece (12) is inserted between the clamping pieces (72, 73).

According to the above configuration, the joint busbar (10) can be easily grounded by simply inserting the connection piece (12) of the joint busbar (10) between the pair of clamping pieces (72, 73) provided on the conductive member (70).

According to an aspect of the present disclosure, the connection piece (12) of the joint busbar (10) is provided with a recess portion (13), and at least one of the pair of clamping pieces (72, 73) of the conductive member (70) is provided with a protrusion (72a) that prevents the connection piece (12) from coming off from the pair of clamping pieces (72, 73) by engaging with the recess portion (13) of the connection piece (12).

According to the above configuration, the protrusion (72a) of the clamping piece (72) can be engaged with the recess portion (13) of the connection piece (12) by simply inserting the connection piece (12) of the joint busbar (10) between the pair of clamping pieces (72, 73) provided on the conductive member (70). Accordingly, the connection piece (12) can be prevented from coming off.

According to an aspect of the present disclosure, the housing (101) is provided with an insertion hole (108) through which the conductive member (130) is inserted from outside to inside the housing (101), and the conductive member (130) is provided with, at an end portion of a portion (131) of the conductive member (130) that is inserted into the housing (101), a first fork terminal (132) that is fitted to the connection piece (112) of the joint busbar (110) when the conductive member (130) is inserted into the housing (101) from outside, and the first fork terminal (132) is provided as the elastic connection portion (132).

According to the above configuration, the first fork terminal (132) at an insertion end of the conductive member (130) can be fitted to the connection piece (112) of the joint busbar (110) by simply inserting the conductive member (130) through the insertion hole (108) of the housing (101), and the joint busbar (110) can be easily grounded.

According to an aspect of the present disclosure, the housing (101) is provided with a guide portion (109) therein, and the guide portion (109) guides the first fork terminal (132) provided at an insertion end of the conductive member (130) to a position where the first fork terminal (132) is fitted to the connection piece (112) of the joint busbar (110) when the conductive member (130) is inserted into the housing (101) from outside through the insertion hole (108).

According to the above configuration, the first fork terminal (132) at the insertion end of the conductive member (130) can be easily fitted to the connection piece (112) of the joint busbar (110) by the guidance of the guide portion (109).

According to an aspect of the present disclosure, the conductive member (130) is provided with, at an end portion of a portion (134) of the conductive member (130) that is located outside the housing (101), a spring portion (135) that comes into elastic contact with a grounding bracket (170) fastened to the vehicle body (190).

According to the above configuration, since the spring portion (135) is provided at the end portion of the portion (134) of the conductive member (130) that is located outside the housing (101), the conductive member (130) can be easily and stably electrically connected to the grounding bracket (170) that fixes the electric junction box (M2) by the spring portion (135).

According to an aspect of the present disclosure, the housing (101) is provided with a circuit board (120) therein, and the circuit board (120) has a ground circuit connected to a base end (152) of a second conductive member (150), and the second conductive member (150) is provided with, at a top end, a second fork terminal (151) fitted to the connection piece (112) of the joint busbar (110).

According to the above configuration, the ground circuit of the circuit board (120) can be grounded to the vehicle body through the second conductive member (150), the joint busbar (110), and the conductive member (130).

The present disclosure is not limited to the above described embodiments, and can be appropriately modified, improved and the like. Materials, shapes, sizes, numbers, arrangement positions and the like of components in the above described embodiments are freely selected and are not limited as long as the present disclosure can be implemented.

What is claimed is:

1. An electric junction box for a vehicle, the electric junction box comprising:

a housing including a connector housing configured to be fitted to a counterpart connector, a plurality of connector terminals being provided in the connector housing;

a joint busbar accommodated in the housing and having a plate shape that includes a first side and a second side opposite to the first side, the joint busbar integrally including a plurality of terminals on the first side and configured to be respectively connected to ground terminals of the counterpart connector, the plurality of terminals being provided as a part of the plurality of connector terminals;

a circuit board accommodated in the housing; and a conductive member supported by the housing and configured to be grounded to a vehicle body, wherein the joint busbar includes a plate-shaped connection piece protruding from the second side of the joint busbar and being connected to the conductive member, the conductive member includes an elastic connection portion that is in elastic contact with the connection piece, the housing is provided with an insertion hole through which the conductive member is inserted from outside to inside the housing, and a guide portion, the guide portion guides the conductive member to a position at the second side of the joint busbar where the conductive member is fitted to the connection piece of the joint busbar when the conductive member is inserted into the housing from outside through the insertion hole, and the plurality of connector terminals, other than the plurality of terminals, are protruding from the second side of the joint busbar and connected to the circuit board.

2. The electric junction box for a vehicle according to claim 1, wherein the conductive member is provided with, as the elastic connection portion, a pair of clamping pieces that clamp the connection piece of the joint busbar such that the connection piece is inserted between the clamping pieces.

3. The electric junction box for a vehicle according to claim 2, wherein the connection piece of the joint busbar is provided with a recess portion, and at least one of the pair of clamping pieces of the conductive member is provided with a protrusion that prevents the connection piece from coming off from the pair of clamping pieces by engaging with the recess portion of the connection piece.

4. The electric junction box for a vehicle according to claim 1, wherein the conductive member is provided with, at an end portion of a portion of the conductive member that is inserted into the housing, a first fork terminal as the elastic connection portion, and the first fork terminal is fitted to the connection piece of the joint busbar when the conductive member is inserted into the housing from outside.

5. The electric junction box for a vehicle according to claim 1, wherein a first part of the conductive member is inside the housing, and a second part of the conductive member is located outside the housing through the insertion hole.

6. The electric junction box for a vehicle according to claim 5, wherein the second part of the conductive member located outside the housing comprises a spring portion that comes into elastic contact with a grounding bracket fastened to the vehicle.

7. The electric junction box for a vehicle according to claim 1, wherein the plurality of connector terminals, other than the plurality of terminals, are integrally included on the second side of the joint busbar, and the plurality of connector terminals, other than the plurality of terminals, each extend along a length direction between a first end and a second end, the first end being integrally included on the second side of the joint busbar, and the second end being connected to the circuit board.

8. An electric junction box for a vehicle, the electric junction box comprising:

a housing including a connector housing configured to be fitted to a counterpart connector, a plurality of connector terminals being provided in the connector housing;

a joint busbar accommodated in the housing, the joint busbar integrally including a plurality of terminals configured to be respectively connected to ground terminals of the counterpart connector, the plurality of terminals being provided as a part of the plurality of connector terminals; and a conductive member supported by the housing and configured to be grounded to a vehicle body, wherein the joint busbar includes a plate-shaped connection piece connected to the conductive member, the conductive member includes an elastic connection portion that is in elastic contact with the connection piece, the housing is provided with an insertion hole through which the conductive member is inserted from outside to inside the housing, the conductive member is provided with, at an end portion of a portion of the conductive member that is inserted into the housing, a first fork terminal as the elastic connection portion, the first fork terminal is fitted to the connection piece of the joint busbar when the conductive member is inserted into the housing from outside, the conductive member is provided with a spring portion at another end portion of another portion of the conductive member that is located outside the housing, and the spring portion is configured to come into elastic contact with a grounding bracket fastened to the vehicle body.

9. An electric junction box for a vehicle, the electric junction box comprising:

a housing including a connector housing configured to be fitted to a counterpart connector, a plurality of connector terminals being provided in the connector housing;

a joint busbar accommodated in the housing, the joint busbar integrally including a plurality of terminals configured to be respectively connected to ground terminals of the counterpart connector, the plurality of terminals being provided as a part of the plurality of connector terminals; and a conductive member supported by the housing and configured to be grounded to a vehicle body, wherein the joint busbar includes a plate-shaped connection piece connected to the conductive member, the conductive member includes an elastic connection portion that is in elastic contact with the connection piece, the housing is provided with an insertion hole through which the conductive member is inserted from outside to inside the housing, the conductive member is provided with, at an end portion of a portion of the conductive member that is inserted into the housing, a first fork terminal as the elastic connection portion, the first fork terminal is fitted to the connection piece of the joint busbar when the conductive member is inserted into the housing from outside, the housing is provided with a circuit board, and the circuit board has a ground circuit connected to a base end of a second conductive member, and the second conductive member is provided with, at a top end, a second fork terminal fitted to the connection piece of the joint busbar.

\* \* \* \* \*